No. 693,147. Patented Feb. 11, 1902.
B. PADDOCK.
HAY BAGGING MACHINE.
(Application filed May 4, 1901.)
(No Model.)

Witnesses

Inventor
Bruce Paddock
By his Attorney
Emil Starek

UNITED STATES PATENT OFFICE.

BRUCE PADDOCK, OF LANSING, MICHIGAN.

HAY-BAGGING MACHINE.

SPECIFICATION forming part of Letters Patent No. 693,147, dated February 11, 1902.

Application filed May 4, 1901. Serial No. 58,801½. (No model.)

*To all whom it may concern:*

Be it known that I, BRUCE PADDOCK, a citizen of the United States, residing at Lansing, in the county of Ingham and State of Michigan, have invented certain new and useful Improvements in Hay-Bagging Machines, of which the following is a full, clear, and exact description, reference being had to the accompanying drawings, forming a part hereof.

My invention has relation to hay-bagging machines; and it consists in the novel arrangement and combination of parts more fully set forth in the specification and pointed out in the claim.

Figure 1:
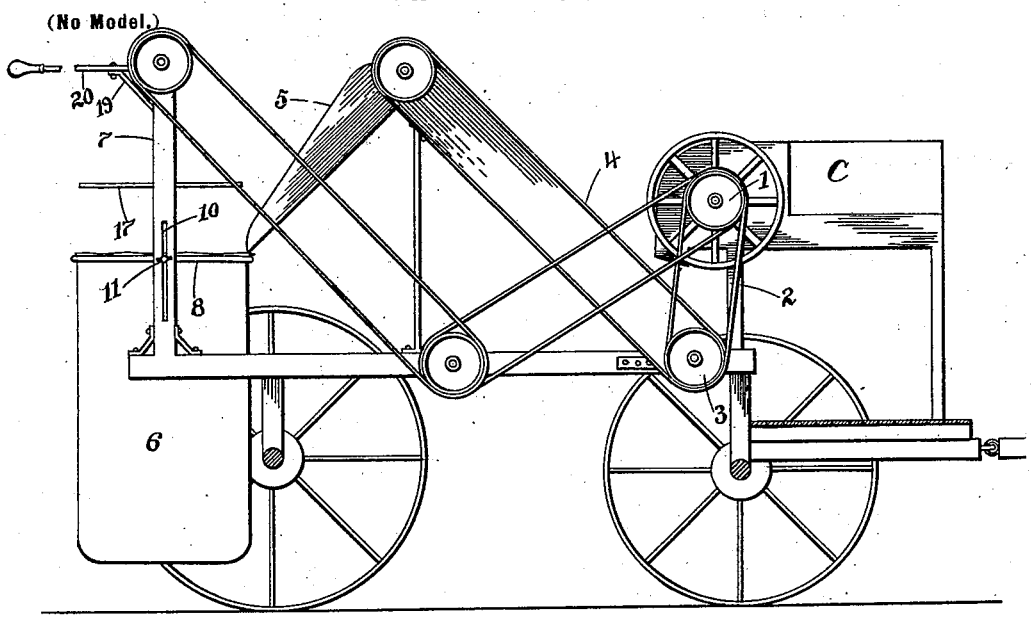
Figure 3:
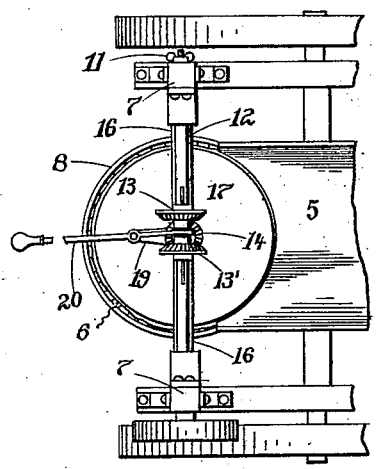
Figure 2:
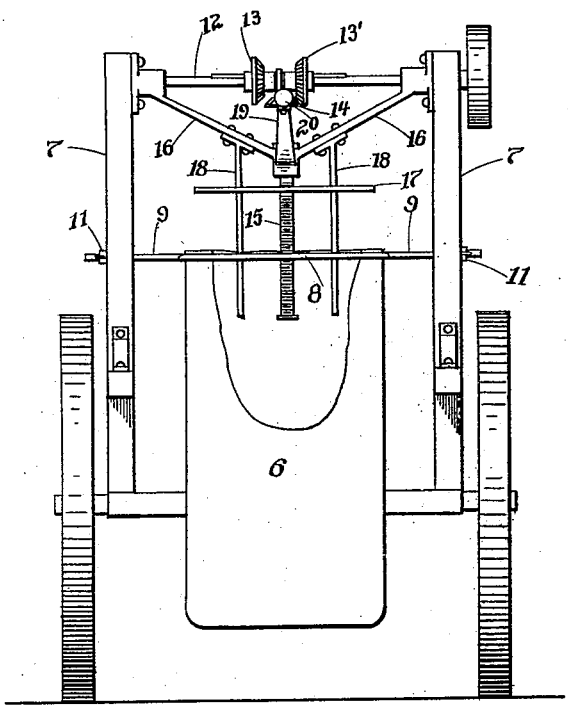

In the drawings, Figure 1 is a side elevation of the machine. Fig. 2 is an end elevation, and Fig. 3 is a top plan of the bagging attachment.

The object of my invention is to provide the ordinary hay-cutter with a bagging attachment whereby the cut hay may be packed in bags and placed on the market in lieu of baled hay, it being well known that cut or chopped hay is superior as a feed to baled hay.

In detail the device may be described as follows:

Referring to the drawings, C represents a hay cutting or chopping machine of any approved type or construction and operated by any suitable source of power. (Not shown.) Carried by the main shaft thereof is a pulley 1, from which extends a belt 2, passing over a second pulley 3 at one end of a belt conveyer 4, the upper end of said conveyer communicating with a chute 5, which delivers the cut hay to the bag 6. The latter is held between the lateral standards 7 7 of the rear frame of the machine, being adjusted to any position by a hoop 8, from which the bag is directly suspended, the hoop being provided with diametrically opposite studs 9, passing through slots 10 of the standards, the ends of the studs being screw-threaded and carrying binding or tightening nuts 11, which serve to secure the hoop at any position along the standards, depending on the size or length of the bag.

Disposed transversely across the top of the standards 7 is a shaft 12, the same having slidingly feathered thereto the hub portions of the pair of bevel gear-wheels 13 13', which, according to the position to which they may have been shifted, respectively engage the terminal pinion 14 of a vertical screw 15, located directly over the bag. The screw 15 has its bearing at the meeting ends of the arms 16 16, forming a part of the rear frame referred to. Passed over the screw 15 and traveling along the same is a disk or plunger 17, which is guided in its reciprocations by the guide-bars 18, depending from the arms 16 and passing through openings formed in said plunger. Projecting rearwardly from the bearing of the screw 15 is an arm or bracket 19, to which is pivoted the shifting lever 20, by which one or the other of the gear-wheels 13 13' are brought into engagement with the pinion 14. The shaft 12 of course revolves always in one direction; but the screw 15 revolves in one or the other direction, depending on which gear 13 13' is in engagement with the pinion 14. When the screw is rotating in one direction, the plunger 17 descends, thus compressing the hay delivered to the bag, and when rotating in the opposite direction the plunger is retracted from the bag. This operation may be repeated until the hay in the bag is compressed to a compact form.

It is to be understood that I do not limit myself to the precise details here shown, as the same may be changed from without departing from the spirit of my invention.

Having described my invention, what I claim is—

In a bagging attachment for hay-cutters, a suitable frame, slotted standards forming part of the same, means for adjustably securing a bag between the standards, a shaft carried at the upper ends of the standards, means for rotating said shaft, bevel gear-wheels feathered to said shaft and movable along the same, a vertical screw mounted below said wheels, a terminal pinion carried by the screw and engaging either one of the said gear-wheels, a shifting lever for bringing one or the other of the gear-wheels into engagement with the pinion, a perforated plunger reciprocating along said screw, and depending guide-bars passing through the plunger, the parts operating substantially as, and for the purpose set forth.

In testimony whereof I affix my signature in presence of two witnesses.

BRUCE PADDOCK.

Witnesses:
H. L. BARNARD,
EDDIE KUNKALMAN.